United States Patent [19]

Feinauer et al.

[11] 4,229,557

[45] Oct. 21, 1980

[54] PROCESS FOR THE PRODUCTION OF WHITE MELAMINE-PHENOL-ALDEHYDE RESINS WHICH ARE RESISTANT TO YELLOWING

[75] Inventors: Dieter Feinauer, Lampertheim; Ludwig Streinz, Mannheim, both of Fed. Rep. of Germany

[73] Assignee: Ciba-Geigy Corporation, Ardsley, N.Y.

[21] Appl. No.: 70,216

[22] Filed: Aug. 27, 1979

[30] Foreign Application Priority Data

Sep. 6, 1978 [CH] Switzerland .......................... 9364/78

[51] Int. Cl.² ............................................. C08G 14/10
[52] U.S. Cl. ..................................... 525/480; 260/17.2; 260/38; 525/504; 525/506; 528/138; 528/141; 528/155; 528/158; 528/163
[58] Field of Search ........................... 525/480, 506, 504; 528/138, 141, 158, 163, 155

[56] References Cited

U.S. PATENT DOCUMENTS

| | | | |
|---|---|---|---|
| 2,457,738 | 12/1948 | Scott ................................. | 528/163 X |
| 2,826,559 | 3/1958 | Updegraff et al. .............. | 528/163 X |
| 3,070,572 | 12/1962 | Oland et al. ...................... | 528/163 X |
| 3,321,551 | 5/1967 | Knutsson ......................... | 528/163 X |
| 3,364,167 | 1/1968 | Imai et al. ........................ | 528/163 X |
| 3,464,956 | 9/1969 | Petersen .......................... | 528/138 X |

FOREIGN PATENT DOCUMENTS

1057400 2/1967 United Kingdom .

*Primary Examiner*—Howard E. Schain
*Attorney, Agent, or Firm*—Luther A. R. Hall

[57] ABSTRACT

Resins which are substantially white and resistant to yellowing are obtained by the addition of ammonium or alkali phosphates or ammonium or alkali borates during the production or processing of melamine-phenol-aldehyde resins in an aqueous basic medium, and by subsequently obtaining the resin by dehydration at a temperature of at least 70° C.

16 Claims, No Drawings

PROCESS FOR THE PRODUCTION OF WHITE MELAMINE-PHENOL-ALDEHYDE RESINS WHICH ARE RESISTANT TO YELLOWING

The present invention relates to a process for the production of melamine-phenol-aldehyde resins in aqueous basic medium, wherein an ammonium or alkali phosphate or ammonium or alkali borate is added to the reaction mixture or to the isolated dry resin, and the resulting resin is isolated by dehydration at elevated temperature or the dry resin is heated at elevated temperature.

Phenol-aldehyde resins and melamine-modified phenol-aldehyde resins have long been employed in the art as impregnating and moulding resins. A basic and known defect of these resins in their yellow to reddish brown colour. In addition, the colour tends to deepen on account of the action of light or air. This defect is especially inherent in those resins which are obtained at pH values of more than 7.5 in the reaction medium.

The intrinsic colour of the resins makes it necessary to add suitable additives, such as fluorescent whitening agents, and to use white pigments, in order to obtain consumer goods with adequate optical properties. However, the defect of the deepening in colour cannot thereby be eliminated. It is also a basic defect of the discoloured resins that it is not possible to regulate specific shades using dyes or pigments, as the intrinsic colour of the resins often contributes to the overall colour.

Methods of obtaining almost colourless melamine-modified phenol-aldehyde resins have already been proposed. According to the teaching of British Pat. No. 1,057,400, the polycondensation is carried out at a pH value of 6 to 7.5 U.S. Pat. No. 3,321,551 proposes a multistage process in which the polycondensation of a phenol-aldehyde precondensate with melamine is carried out at a pH value of 6.9 to 7.8. Applicant's own experiments have shown that resin solutions obtained at these pH values tend to coagulate and therefore do not have a sufficient storage life for e.g. the dry impregnating method.

Storable resin solutions are obtained at pH values of more than 8, but the intrinsic colour of the resulting resins is a drawback. It is the object of the present invention to provide a process for the production of white melamine-phenol-aldehyde resins which are substantially resistant to yellowing and have a sufficient shelf life, said process being carried out at pH values above 8.

Accordingly, the present invention provides a process for the production of melamine-phenol-aldehyde resins, which are substantially white and resistant to yellowing, by the polycondensation of unsubstituted or alkyl-substituted melamine with mono- or polyhydric, unsubstituted or alkyl-substituted phenols and an aldehyde, in an aqueous basic reaction medium at a pH value between 8 and 11, which comprises adding to the reaction mixture or the isolated dry resin one or more water-soluble ammonium or alkali phosphates or ammonium or alkali borates in an amount of at least 0.05% by weight, based on the reaction mixture or the dry resin, and subsequently isolating the resulting resin by dehydration at a temperature of at least 70° C. or heating the dry resin to at least 70° C.

In particular, melamine is employed in the process of the invention. However, it is also possible to employ alkyl-substituted melamine, in which case alkyl can be e.g. methyl or ethyl.

Unsubstituted phenol is preferably employed in the process of the invention, as it has attained the most importance in resins. Suitable polyhydric phenols are e.g. the dihydroxybenzenes, in particular resorcinol. Suitable alkyl-substituted phenols are in particular the cresols and xylenols.

The most preferred aldehyde is formaldehyde. It can be employed in the commercially available aqueous formaldehyde solutions or in the form of paraformaldehyde. The aqueous solutions normally contain an alcohol, for example methanol, as stabiliser. This alcohol, however, must not be removed. Further suitable aldehydes are e.g. acetaldehyde and propionaldehyde.

The molar ratio of melamine to phenol to aldehyde can be so chosen that the resin obtained has the desired properties for the intended end use, for example as moulding compound, as impregnating resin, as adhesive or as coating compound. A molar ratio of about 1:(0.05–0.3):(1.5–6.0), in particular 1:(0.1–0.25):(2.0–4.0), has been found to be advantageous.

The process of the invention is preferably carried out at a pH value between 8 and 9.5.

The amount of water-soluble ammonium or alkali phosphates or borates added is at least 0.05% by weight. The upper range is determined in accordance with the factors of economy and expediency. Thus, for example, 10% by weight and more can be added. Small amounts, however, suffice to attain the desired effect, so that additional amounts of 0.05 to 1%, in particular 0.1 to 0.5%, by weight, have been found advantageous.

Preferred borates and phosphates to be used in the process of the invention are the ammonium, potassium and, in particular, sodium salts. The borates and phosphates can be salts with monomer, dimer, oligomer or polymer anions. Suitable borates are the orthoborates, pyroborates, metaborates and those which contain cyclic anions, for example borax.

Examples of phosphates are: orthophosphate and orthohydrophosphate, pyrophosphate and hydrogen pyrophosphate, triphosphate, tetraphosphate, metaphosphate, trimetaphosphate, tetrametaphosphate, e.g. sodium phosphate, sodium monohydrogenphosphate, sodium dihydrogenphosphate or sodium metaphosphate.

In carrying out the process of the invention, the procedure is usually such that a mixture of the reactants is heated to the desired temperature. The amount of reactants in the aqueous basic medium can be about 20 to 80% by weight, preferably 40 to 60% by weight, based on the whole reaction mixture. To attain sufficient polycondensation rates, the reaction temperature shall be at least 70° C. Preferably, the reaction is carried out at reflux temperature (about 95° C.).

In another embodiment of the process of the invention, a precondensate can be obtained initially from phenol and a portion of the aldehyde in basic medium and subsequently condensed with melamine and the remainder of the aldehyde.

The time at which the borates and phosphates are added is not critical. They can be present at the beginning of the reaction or added during it. However, it is preferred not to add the borates and phosphates until the polycondensation is complete, in which case it can be expedient to cool the reaction mixture beforehand to e.g. below 40° C. In principle, it is therefore also possible to prepare aqueous resin solutions in a first process step, to store them temporarily and only to add the borates or phosphates immediately before the dehydration to obtain the resin.

The dehydration temperature is at least 70° C., for example up to about 160° C. The preferred temperature range is from 100° to 140° C. The dehydration is carried out in the known devices for the purpose (e.g. falling-film evaporators) under normal pressure to slight overpressure.

The procedure to be followed in the process of the invention can also be such that, after the polycondensation, the dry resin is initially isolated by dehydration and the treatment with the phosphates and/or borates is not carried out until after the isolation. The discoloured dry resin is mixed with the borates and/or phosphates in the devices conventionally employed for the purpose. The mixture can be heated until it melts. It is particularly advantageous to combine the mixing procedure and the heating with the processing to moulded articles, for example by injection moulding or extrusion. The components can be mixed by charging the individual ingredients into the feed hopper of the extruder. It is, however, more advantageous to premix the components. The processing temperatures are normally in the range from 90° to 150° C., preferably of 100° to 140° C.

The customary additives, for example moulding assistants, such as plasticisers or lubricants, fillers, reinforcing fillers, dyes or pigments, can be added before, during, or after the polycondensation.

A particular advantage of the process of the invention resides in the fact that, in one possible embodiment thereof, the dehydration can be carried out using the impregnation method. The addition of the borates and/or phosphates lowers the stability of the aqueous resin solutions only insignificantly, so that an adequate temporary storage is possible. In principle, however, the borates and/or phosphates can also be added by the processor. The dehydration can also be carried out by obtaining dry resins direct in the form e.g. of flakes, which can be further processed by conventional methods to moulded consumer articles of all kinds. The dry resin can in this case still contain not more than 20% by weight, preferably not more than 10% by weight, of water.

The process of the present invention results, surprisingly, in duroplastic moulding compounds of melamine-phenol-aldehyde resins which are substantially white and which can also be coloured in light shades without difficulty. A particularly advantageous feature is the simultaneous increased resistance to yellowing caused by the action of light and air.

The following Examples illustrate the invention in more detail.

EXAMPLE 1

A reaction vessel is charged with the following constituents: 1 kg of melamine, 0.125 kg of phenol, 1.5 kg of formaldehyde (37%) and 0,005 kg of NaOH.

With stirring, the reaction mass is heated for 1 hour to reflux temperature. At about 70° C. a clear solution with a pH of about 9 forms from the suspension. During the condensation which follows the pH falls again to about 8. The polycondensation is carried out up to a cloud point of 70° C. (Determination of the cloud point: 5 ml of resin solution and 5 ml of distilled water must, when mixed at the indicated temperature, turn from turbid to clear or vice versa). The reaction mass is then cooled to 40° C. and 7 g of borax are added. The resin syrup is then dehydrated in a falling-film evaporator and a white dry resin is isolated.

EXAMPLE 2 AND COMPARISON EXAMPLES

The procedure of Example 1 is repeated once without the addition of borax, once with the addition of 24 g of borax when the condensation is complete and once before the start of the polycondensation. The Gardner colour number is determined from the products obtained. The following table demonstrates that the products obtained by the process of the invention have a better degree of whiteness.

| Condensation | Colour value (Gardner) |
| --- | --- |
| without addition of borax (comparson) | 4 |
| addition of borax after cooling (comparison) | 3 |
| addition of borax before the start of condensation (process of the invention) | 2 |

The products are additionally dehydrated in a falling-film evaporator at a temperature between 90° and 160° C. The brightness reference values (BRV) and blue-yellow values (BYV) of these products are measured with an Elephro device. The more negative values indicate the greater yellowish hue.

| Condensation | BRV | BYV |
| --- | --- | --- |
| without addition of borax (comparison) | 79.8 | −4.2 |
| addition of borax after cooling (process of the invention) | 80.6 | −2.5 |
| addition of borax before the start of condensation (process of the invention) | 81.7 | −1.1 |

EXAMPLE 3

A pre-mix of the following composition is prepared from a ground dry resin with 8% residual moisture (obtained according to Example 1 with the addition of 24 g of condensation additive after the resin syrup has cooled): 52.5% by weight of resin, 32.4% by weight of cellulose, 12% by weight of lithopone, 2% by weight of $TiO_2$, 1% by weight of lubricant and 0.1% by weight of hardener.

This pre-mix is compacted under heat in a kneader and the resulting lumps are ground to a dry resin. The granules obtained are pressed to sheets. The brightness reference values and blue-yellow values of the resin and sheets are measured.

Sheets are prepared by the same process, except that the active compound is added at the start of the polycondensation. The same measurements are made. Sheets obtained without addition of condensation additive are used as comparison. In addition, the Gardner colour number is determined.

The results are reported in the following table. It is evident from the table that the sheets obtained according to the invention have substantially lower blue-yellow values and yellow only to an insignificant degree even after UV irradiation for 24 hours.

| Condensation additive | Addition start | Addition cooling | Gardner colour number | Colour values of the dried resin BRV | Colour values of the dried resin BYV | Colour values of the sheets after pressing BRV | Colour values of the sheets after pressing BYV | Colour values of the sheets after 24 h UV-irradiation BRV | Colour values of the sheets after 24 h UV-irradiation BYV |
|---|---|---|---|---|---|---|---|---|---|
| — | — | — | 4 | 79.8 | −4.2 | 76.8 | −17.6 | 74.4 | −21.4 |
| $Na_2B_4O_7$ | x | | 2 | 81.7 | −1.1 | 79.7 | −11.4 | 78.1 | −13.8 |
| $Na_2B_4O_7$ | | x | 3 | 80.6 | −2.5 | 80.8 | −12.1 | 78.4 | −15.9 |
| $NaH_2PO_4$ | x | | 1 | 82.5 | −0.73 | 81.7 | −8.2 | 81.1 | −10.7 |
| $NaH_2PO_4$ | | x | 3 | 81.6 | −2.45 | 81.7 | −8.2 | 81.0 | −12.7 |
| $Na_2HPO_4$ | x | | 3 | 79.9 | −4.7 | 79.3 | −14.9 | 77.6 | −19.9 |
| $Na_2HPO_4$ | | x | 3 | 80.2 | −5.1 | 78.9 | −14.7 | 76.2 | −18.5 |
| $Na_4P_2O_7$ | x | | 2 | 80.8 | −3.6 | 81.1 | −9.4 | 78.5 | −13.4 |
| $Na_4P_2O_7$ | | x | 2.5 | 80.4 | −4.1 | 78.0 | −16.5 | 77.7 | −20.1 |
| $NH_4H_2PO_4$ | x | | 2 | 82.7 | −1.3 | 78.9 | −12.8 | 78.6 | −16.2 |
| $NH_4H_2PO_4$ | | x | 2.5 | 81.6 | −3.4 | 78.6 | −12.5 | 77.3 | −17.8 |
| $(NH_4)_2HPO_4$ | x | | 2 | 82.8 | −1.9 | 78.9 | −13.4 | 78.6 | −16.9 |
| $(NH_4)_2HPO_4$ | | x | 2.5 | 81.4 | −2.8 | 78.8 | −13.0 | 78.3 | −17.0 |
| $KH_2PO_4$ | x | | 2 | 82.6 | −0.7 | 81.8 | −7.7 | 81.4 | −19.6 |
| $KH_2PO_4$ | | x | 3 | 81.8 | −3.1 | 78.0 | −16.4 | 77.7 | −20.2 |
| $K_2HPO_4$ | x | | 3 | 80.9 | −3.5 | 78.6 | −14.9 | 76.8 | −18.5 |
| $K_2HPO_4$ | | x | 3–4 | 80.9 | −4.4 | 79.4 | −14.7 | 77.6 | −18.6 |

What is claimed is:

1. A process for the production of melamine-phenol-aldehyde resins which are substantially white and resistant to yellowing, by the polycondensation of unsubstituted or alkyl-substituted melamine with mono- or polyhydric, unsubstituted or alkyl-substituted phenols and an aldehyde, in an aqueous basic reaction medium at a pH value between 8 and 11, which comprises adding to the reaction mixture or to the isolated dry resin one or more water-soluble ammonium or alkali phosphates or ammonium or alkali borates in an amount of at least 0.05% by weight, based on the reaction mixture or the dry resin, and subsequently isolating the resulting resin by dehydration at a temperature of at least 70° C. or heating the dry resin to at least 70° C.

2. A process according to claim 1 which comprises the use of dihydroxybenzenes as polyhydric phenols.

3. A process according to claim 1 wherein the aldehyde is acetaldehyde.

4. A process according to claim 1, wherein the molar ratio of melamine to phenol to aldehyde is 1:(0.05–0.3):(1.5–6.0), in particular 1:(0.1–0.25):(2.0:4.0).

5. A process according to claim 1, wherein the dry resin is heated during the processing to moulded articles.

6. A process according to claim 1, wherein the phosphates or borates are added in an amount of 0.05 to 1% by weight.

7. A process according to claim 1 wherein ammonium or potassium phosphates or borates are added.

8. A process according to claim 1, wherein the borates and phosphates contain monomer, dimer, oligomer or polymer anions.

9. A process according to claim 1, wherein borax, sodium phosphate, sodium hydrogenphosphate, sodium dihydrogenphosphate, sodium pyrophosphate or sodium metaphosphate is added.

10. A process according to claim 1, wherein the dehydration is carried out at a temperature in the range between 70° and 160° C.

11. A process according to claim 1 which comprises the use of cresols or xylenols as alkyl-substituted phenols.

12. A claim according to claim 1 which comprises the use of phenol.

13. A process according to claim 1 wherein the aldehyde is formaldehyde.

14. A process according to claim 6, wherein the phosphates or borates are added in an amount of 0.1 to 0.5% by weight.

15. A process according to claim 1 wherein sodium phosphates or borates are added.

16. A process according to claim 10 wherein the dehydration is carried out at a temperature in the range between 100° and 140° C.

* * * * *